United States Patent [19]

Judge, Jr.

[11] E Re. 31,593

[45] Reissued Jun. 5, 1984

[54] UNIVERSAL CRANKSHAFT FINISHING MACHINE

[75] Inventor: Edward E. Judge, Jr., Lansing, Mich.

[73] Assignee: Industrial Metal Products Corp., Lansing, Mich.

[21] Appl. No.: 438,901

[22] Filed: Jan. 13, 1983

Related U.S. Patent Documents

Reissue of:

[64] Patent No.: 4,290,238
Issued: Sep. 22, 1981
Appl. No.: 104,784
Filed: Dec. 18, 1979

[51] Int. Cl.[3] ..... B24B 5/42

[52] U.S. Cl. ..... 51/58; 51/62; 51/67; 51/165.77

[58] Field of Search ..... 51/57, 58, 62, 67, 60, 51/50 PC, 105 R, 165.77; 29/90

[56] References Cited

U.S. PATENT DOCUMENTS

| | | | |
|---|---|---|---|
| 1,840,231 | 1/1932 | Harrison | 51/50 PC |
| 2,195,053 | 3/1940 | Wallace | 51/58 |
| 2,277,047 | 3/1942 | Indge | 51/67 |
| 2,959,841 | 11/1960 | Judge, Jr. | 29/90 |
| 3,344,559 | 10/1967 | Inaba | 51/105 R |
| 3,548,546 | 12/1970 | Thielenhaus | 51/58 |
| 3,797,176 | 3/1974 | Wespi | 51/165.77 |

FOREIGN PATENT DOCUMENTS

| | | | |
|---|---|---|---|
| 231332 | 5/1969 | U.S.S.R. | 51/58 |

*Primary Examiner*—Harold D. Whitehead

[57] ABSTRACT

A universal crankshaft pin and main bearing finishing machine having one pair of pin and main bearing arms with finishing shoes simultaneously engageable with one pair of pin and main bearings. A programmable controller and encoders automatically monitor drives which position and oscillate the arms over the width of the bearings for each pair of pin and main bearings until all required bearings of the crankshaft are finished. Adjustment and automatic programs are provided for different crankshafts which may vary in length, number of cylinders, stroke, axial location and width of bearings.

27 Claims, 20 Drawing Figures

PART VARIABLE REGISTER LOCATION

| DIMENSION | PART # 1 | 2 | 3 | 4 | 5 | 6 | 7 | 8 | 9 |
|---|---|---|---|---|---|---|---|---|---|
| A | | | | | | | | | |
| B | | | | | | | | | |
| C | | | | | | | | | |
| D | | | | | | | | | |
| E | | | | | | | | | |
| F | | | | | | | | | |
| G | | | | | | | | | |
| H | | | | | | | | | |
| I | | | | | | | | | |
| J | | | | | | | | | |
| K | | | | | | | | | |
| L | | | | | | | | | |
| M | | | | | | | | | |
| N | | | | | | | | | |
| | | | | | | | | | |
| P | | | | | | | | | |
| Q | | | | | | | | | |
| R | | | | | | | | | |
| S | | | | | | | | | |
| T | | | | | | | | | |
| U | | | | | | | | | |
| V | | | | | | | | | |
| W | | | | | | | | | |
| X | | | | | | | | | |
| Y | | | | | | | | | |
| Z | | | | | | | | | |
| AA | | | | | | | | | |
| BB | | | | | | | | | |
| CC | | | | | | | | | |
| DD | | | | | | | | | |
| EE | | | | | | | | | |
| FF | | | | | | | | | |

UNIVERSAL CRANKSHAFT FINISHING MACHINE

Matter enclosed in heavy brackets [ ] appears in the original patent but forms no part of this reissue specification; matter printed in italics indicates the additions made by reissue.

BACKGROUND OF THE INVENTION

Polishing, burnishing and filet rolling of crankshaft pin and main bearings has been accomplished for high volume production crankshafts with special single purpose machines employing multiple arms, one for each bearing to be processed, and one or two master crankshafts driven at synchronous speed with the workpiece crankshaft to match the eccentricity of the pin bearings. A fixed width of tooling has been typical, based on the width of the respective bearing surfaces for the production crankshaft, so that in converting such machines to any different crankshaft, major retooling and repositioning of multiple arms for all of the bearings may be involved. A typical special purpose high volume shaft burnishing machine which has been used in commercial production is disclosed in my prior U.S. Pat. No. 2,959,841 issued on Nov. 15, 1960. Such machines are too costly and not appropriate for low and medium volume crankshaft production, or for crankshaft repair in reclaiming used crankshafts, for which purpose hand polishing or manually controlled movement of polishing arms have been used in the state of the art.

SUMMARY OF THE INVENTION

The present universal crankshaft finishing machine has been developed to meet the need for automated finishing of low and medium volume crankshaft production, as well as crankshaft repair, having the versatility to accommodate any family of crankshafts including different lengths, number of cylinders, stroke and bearing widths with manual operations limited to loading and unloading of individual workpiece crankshafts. A pair of pin and main bearing arms are adapted to perform the finishing operation successively on all bearings of the crankshaft with programmed automatic control of arm positioning, oscillation to accommodate different bearing widths, and cycle duration to achieve production polishing, for example, of a six cylinder crankshaft in approximately two to three minutes.

An adjustable eccentric is employed for the pin bearing arm which provides the effect of a master crankshaft without the necessity of multiple arms or different arms for different crankshaft throws. A programmable controller and absolute encoder control system for positioning the pin and main arms provides accuracy in arm location and oscillating stroke so that a single shoe may accommodate varying widths of bearings. Retraction of the drive for the pin arm is accomplished for indexing of the crankshaft workpiece without losing orientation and the pin arm is constructed with minimum weight and single point drive engagement at the center of gravity to permit high orbital drive speeds without incurring inertia variations in polishing pressure during the rotational cycle. Hydraulic or equivalent drives for crankshaft rotation and arm positioning and oscillation are provided with high and low rates to achieve rapid and accurate positioning of the arms and rapid and accurate rotation of the crankshaft for finishing and indexing operations. The programmable controller accommodates individual programs for each of the family of crankshafts to be processed so that the only required manual adjustments are for different overall lengths and stroke of crank throw.

BRIEF DESCRIPTION OF THE DRAWINGS

With reference to FIG. 1 the main elements of the illustrated preferred embodiment illustrated in enlarged views of the other figures are indicated by corresponding figure numbers and include head stock 3, pin and main arm drives 6, pin arm slide assembly 9, pin arm 14, main arm slide 16, main arm 18 and tailstock 19. The general operation of the machine involves manually mounting a crankshaft between the head stock 3 and tailstock 19 with the first pin of the crankshaft to be finished facing the pin arm 14; actuating the pin and main arm drive assemblies 6 to move the pin arm assembly 14 and main arm assembly 18 into alignment with the first pin and main bearings to be finished; (e.g. at the tailstock end) moving the pin and main arm finishing shoes into engagement with such pin and adjacent main bearings of the crankshaft; driving the crankshaft and simultaneously, through the head stock assembly, driving the pin arm assembly in an eccentric path corresponding to the throw of the crankshaft pin; oscillating the pin arm and main arm to the extremities of the pin and main bearings to be finished during rotation of the crankshaft to complete the finishing operation for one pair of pin and main bearings, stopping rotation of the crankshaft with the finished pin extending toward the pin arm; disengaging and retracting the pin and main arms; disengaging the synchronized drive between the crankshaft and pin arm; indexing the next pin of the crankshaft to be finished into facing alignment with the pin arm; actuating the pin and main arm drive assembly to a new position of alignment with such next pin and main bearing to be finished; extending the pin and main arms into operating engagement; reengaging the synchronized drive from the head stock 3; again driving the crankshaft and pin arm assembly to effect the finishing operation on the second pair of pin and main bearings; and similarly repeating such operations for each of the pin and main bearings to be finished, all under automatic programmed control of the machine.

Figure 1:
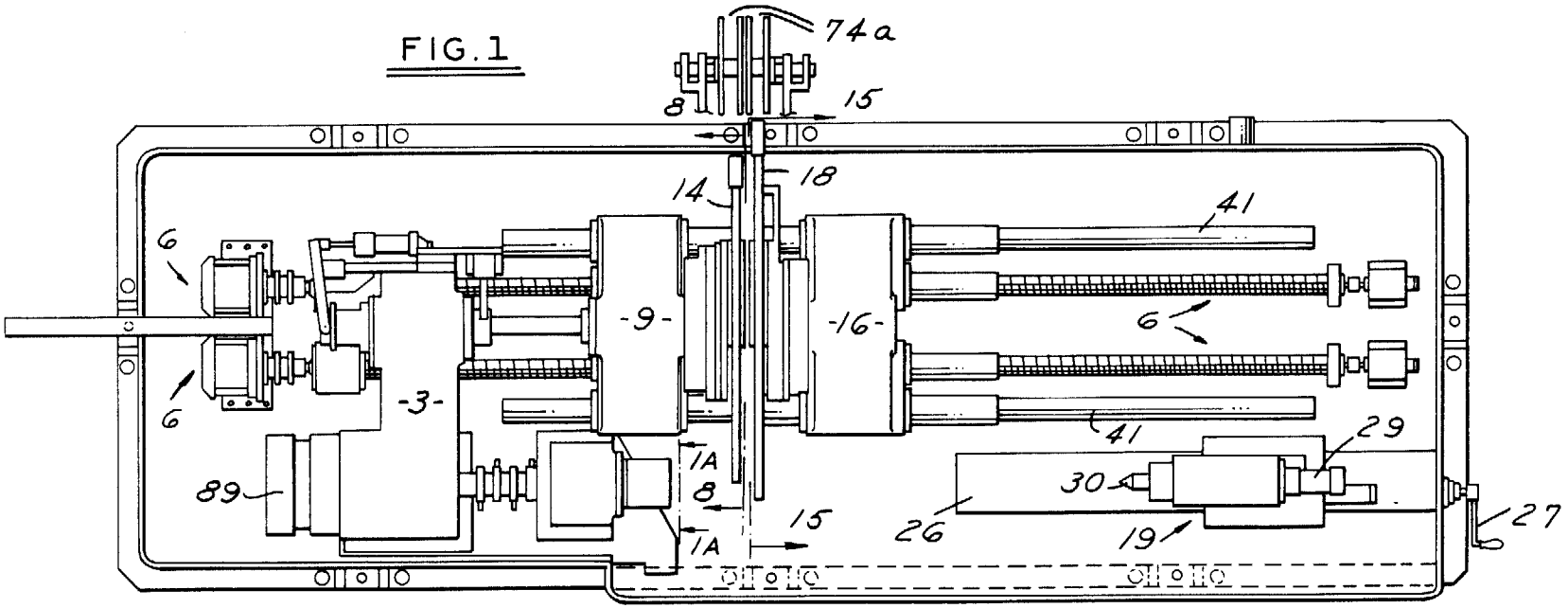
FIG. 1 is a plan view of a preferred embodiment of the machine.
Figure 1A:
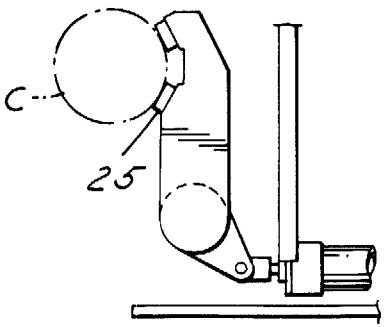
FIG. 1A is a fragmentary sectional view taken along the line 1A—1A of FIG. 1.
Figure 2:
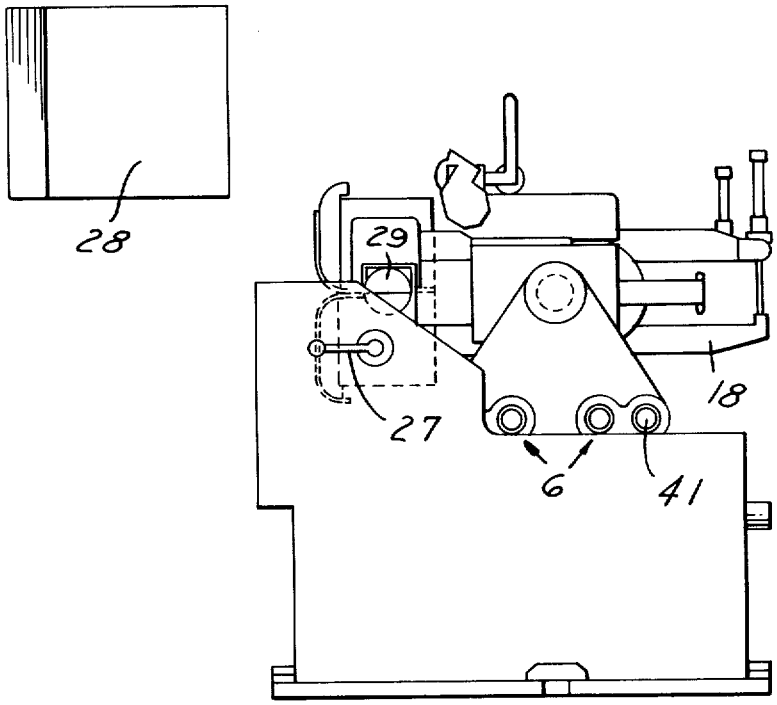
FIG. 2 is an end elevation of the machine.

More specifically with reference to FIGS. 1, 1A, 3 and 19 a workpiece crankshaft C is manually loaded onto a part support 25 in raised position at the head stock and a part support 26 at the tailstock and the first pin to be finished is manually aligned to extend toward the pin arm assembly 14. As a preliminary adjustment when any change crankshaft length or pin and main bearing locations are involved, the tailstock 19 is adjusted by hand crank 27 to a required longitudinal position and a selector switch set to the program required for the crankshaft involved at a push button panel 28. At this point the automatic cycle push button is depressed, cylinder 29 advances the tailstock center 30 to engage the crankshaft holding it in engagement with the part driver 31 keyed to drive shaft 32 on which proximity switches 33 are mounted at angular positions corresponding to various angular pin positions of the various crankshafts to be finished.

Figure 6:
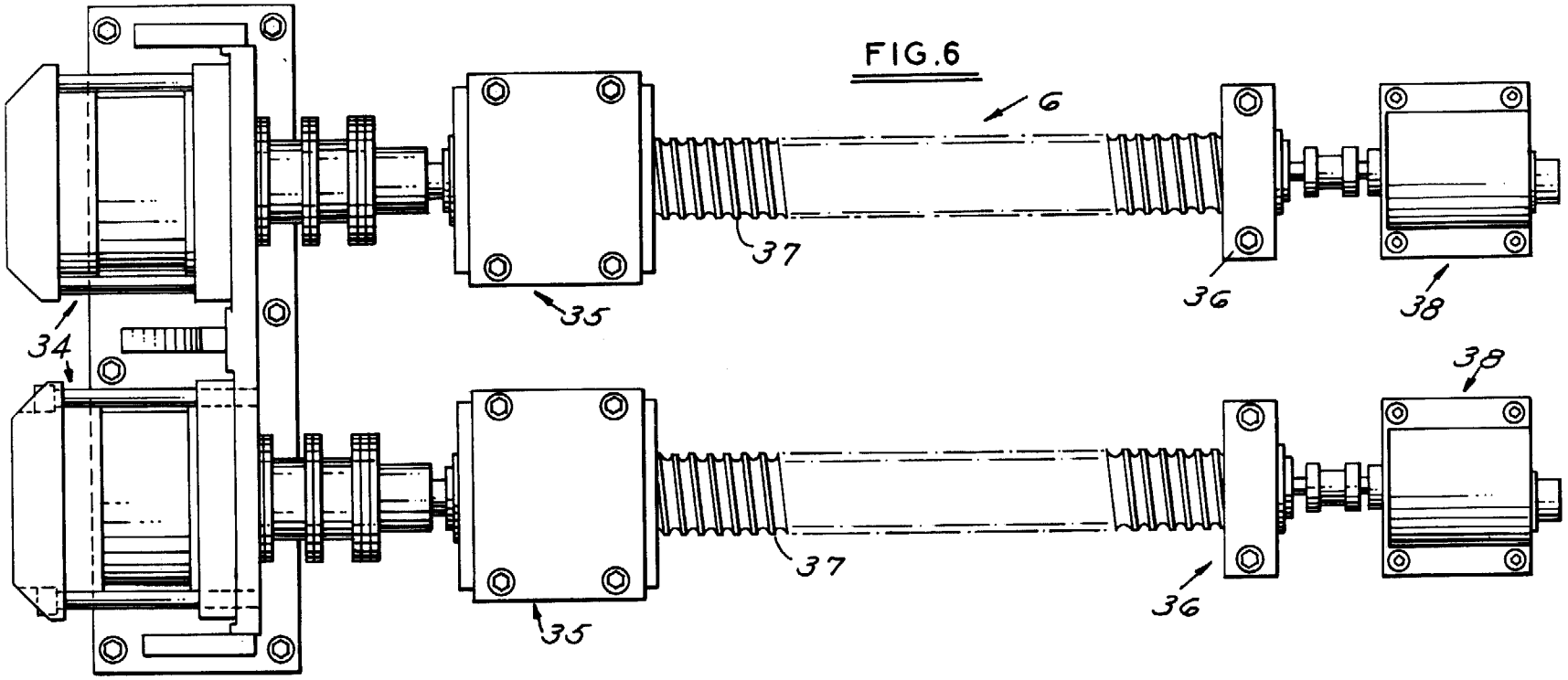
FIG. 6 is an enlarged plan view of the pin arm drive and main arm drive shown in FIG. 1.
Figure 7:
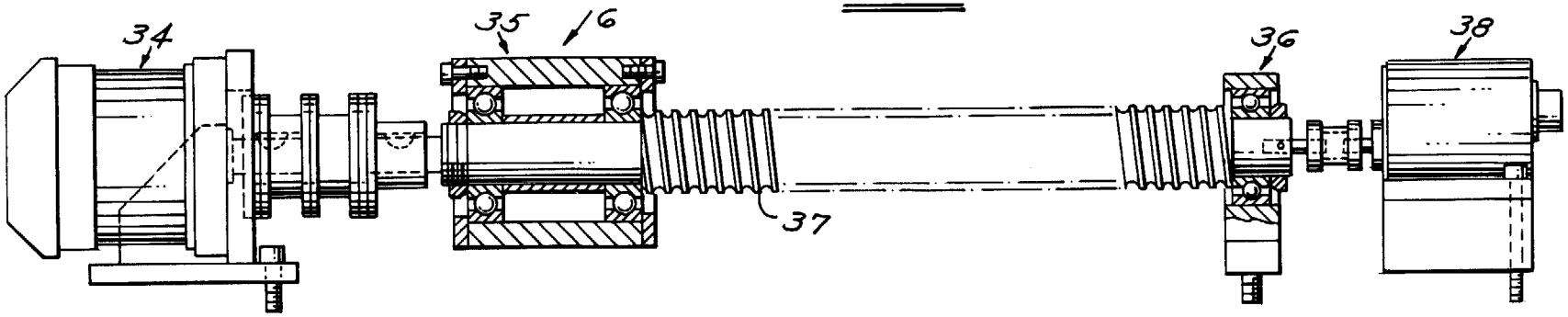
FIG. 7 is a partially sectioned side elevation of the main arm driven shown in FIG. 6.

With additional reference to FIGS. 6 and 7 each of the pin and main drive arm assemblies 6 includes a hydraulic motor drive 34, fixed longitudinal support bearings 35 and 36, ball lead screw 37, and at each end an absolute encoder 38 which monitors the exact axial position of the pin and main arm assemblies over the entire length of selective positioning. Each encoder is directly coupled to its drive shaft and for convenience adjusted to a zero readout at the crankshaft head from which all pin and main bearing dimensions are applied on the crankshaft part drawing. Each encoder is capable with a one half inch lead screw pitch to monitor 1,000 increments per inch and, with fifty inch lead screws, 50,000 absolute increments over the entire length of travel of the respective pin and main arm assemblies; however, for certain finishing operations such as paper polishing an accuracy of $\pm 0.005''$ in the oscillating reciprocation of the pin and main arm assemblies is fully adequate and to minimize capacity requirements for the programmable controller 100 incremental steps per revolution may be adopted for controlling pin and main arm longitudinal position for both initial engagement and oscillating stroke.

Figure 8A:
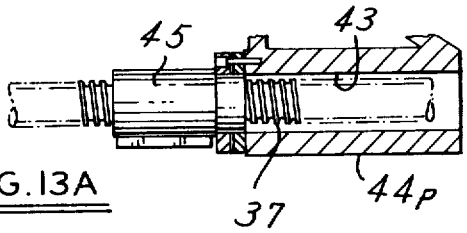
FIG. 8A is an enlarged end elevation of the pin arm slide assembly taken along the line 8—8 of FIG. 1 omitting the pin arm per se.
Figure 13A:
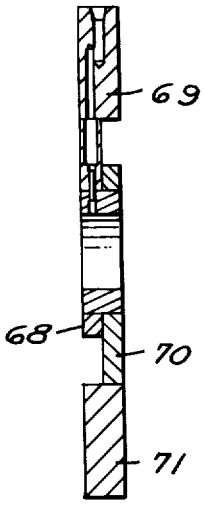
FIG. 13A is a sectional view taken along the line 13A—13A of FIG. 13.
Figure 8:
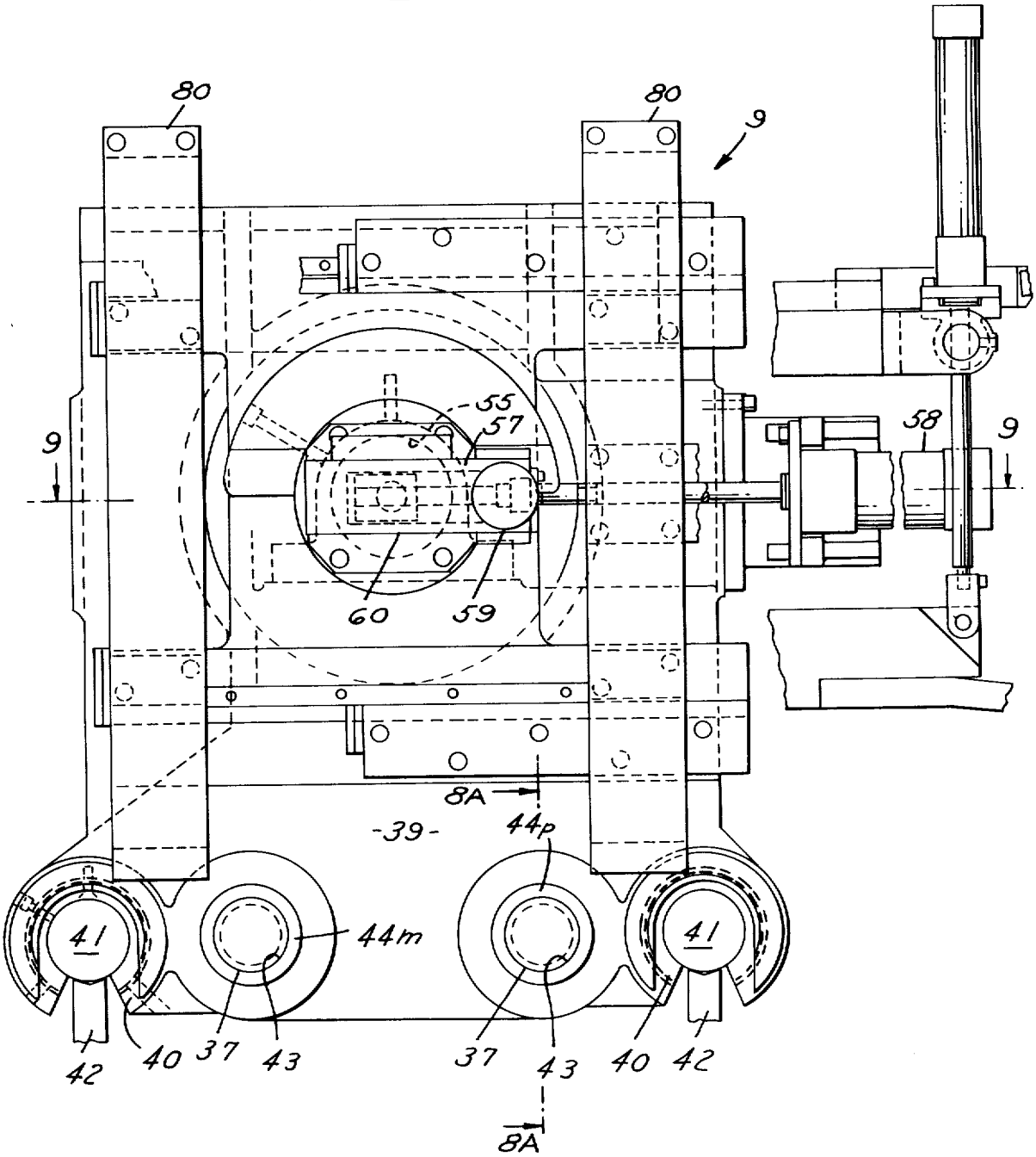
FIG. 8 is a fragmentary sectional view taken along the line 8A—8A of FIG. 8.
Figure 9:
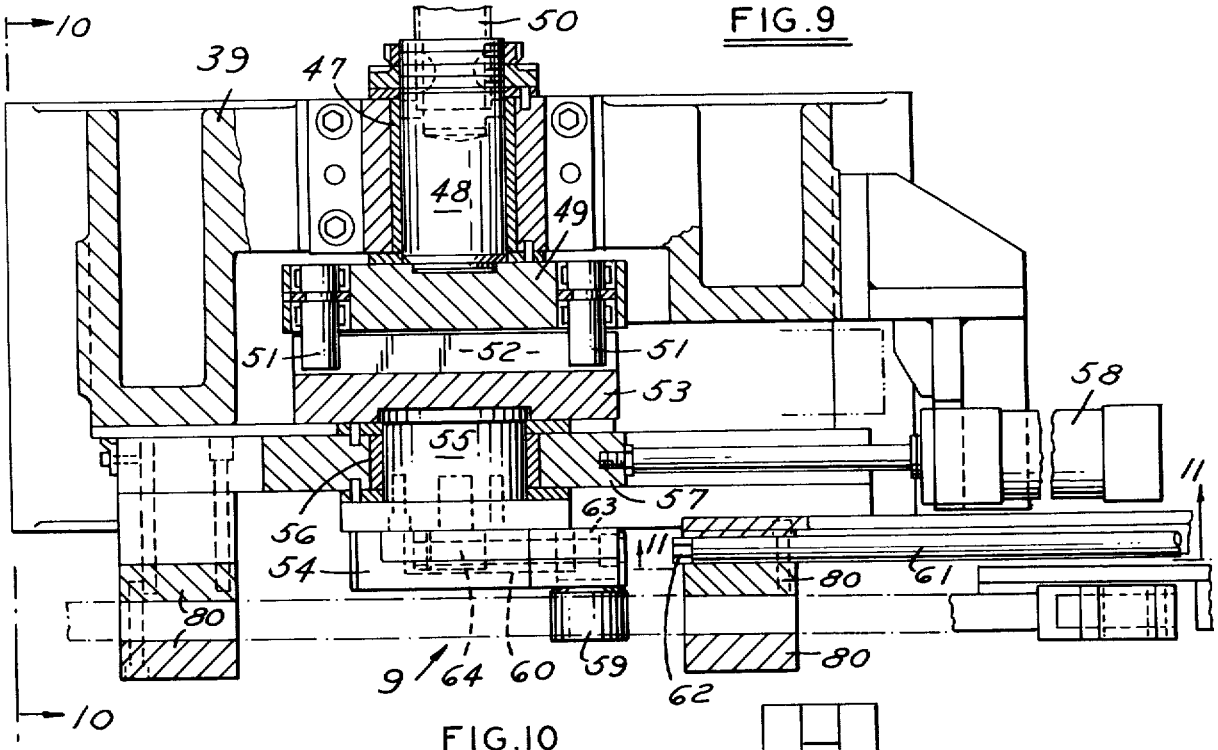
FIG. 9 is a sectional plan view taken along the line 9—9 of FIG. 8.

With additional reference to FIGS. 8, 8A and 9 the pin arm slide assembly 9 includes a rigid housing 39 having segmental sleeve bearings 40 slidable on fixed cylindrical guide rails 41 mounted on fixed longitudinal supports 42 and includes apertured passages 43 for the lead screws 37 for both the pin and main arm assemblies. The housing extension 44p which includes the passage for the pin arm lead screw 37 has bolted thereto a recirculating ball nut 45 which engages the lead screw for accurately driving the pin arm slide assembly to its required position.

Figure 15:
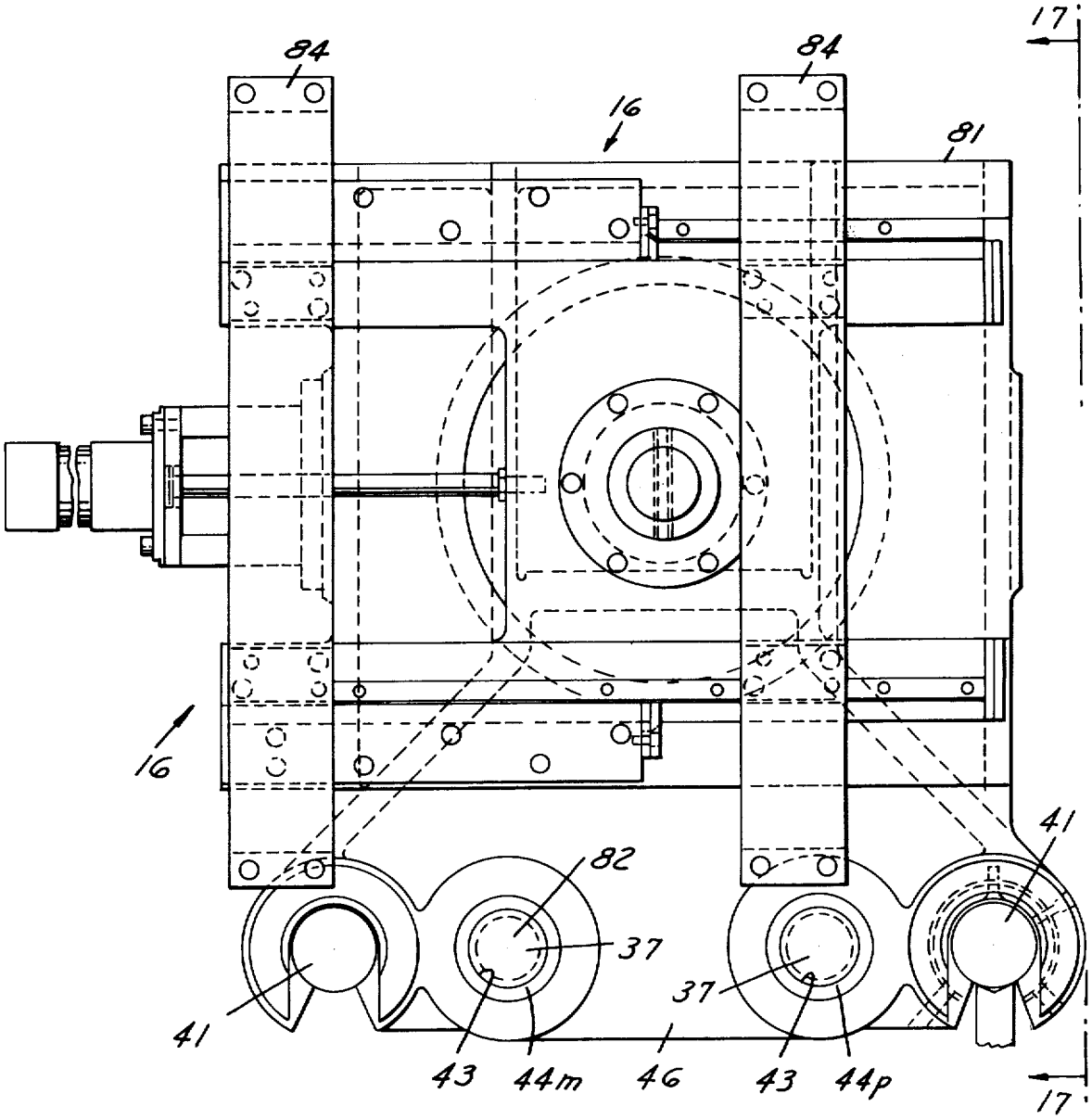
FIG. 15 is an enlarged elevation view taken along the line 15—15 of FIG. 1 showing the main arm slide with main arm per se omitted.
Figure 17:
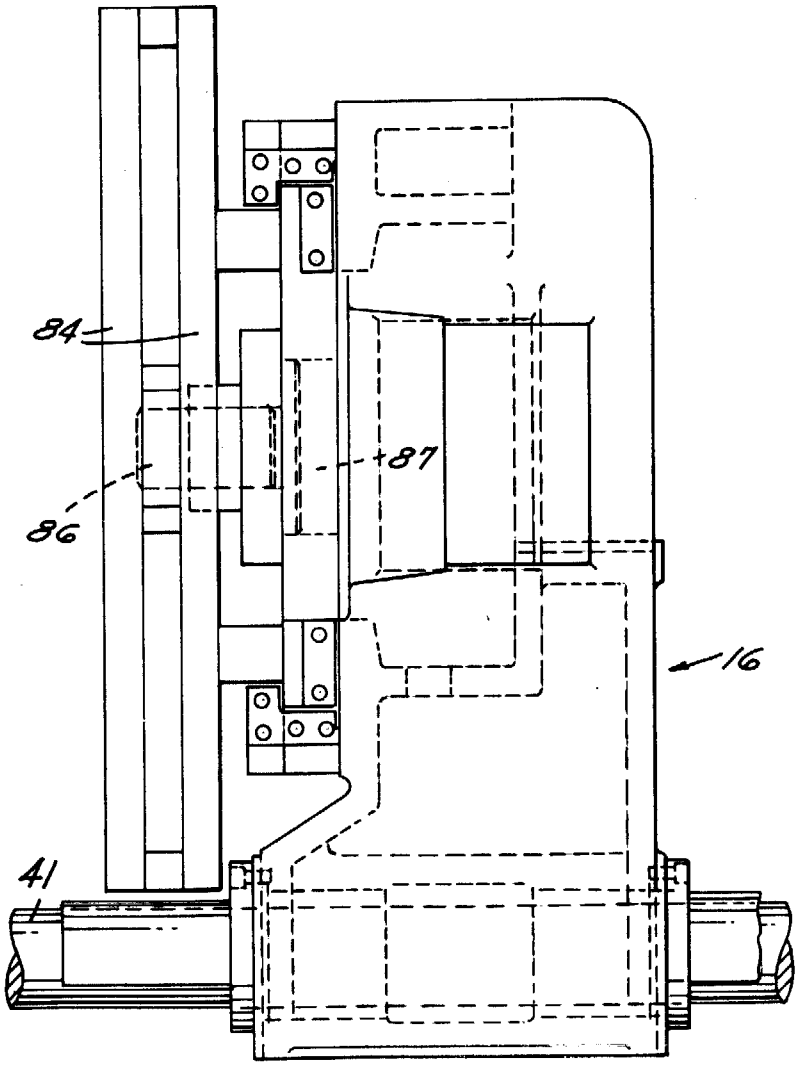
FIG. 17 is an elevation taken in the direction of arrow 17 in FIG. 15.
Figure 16:
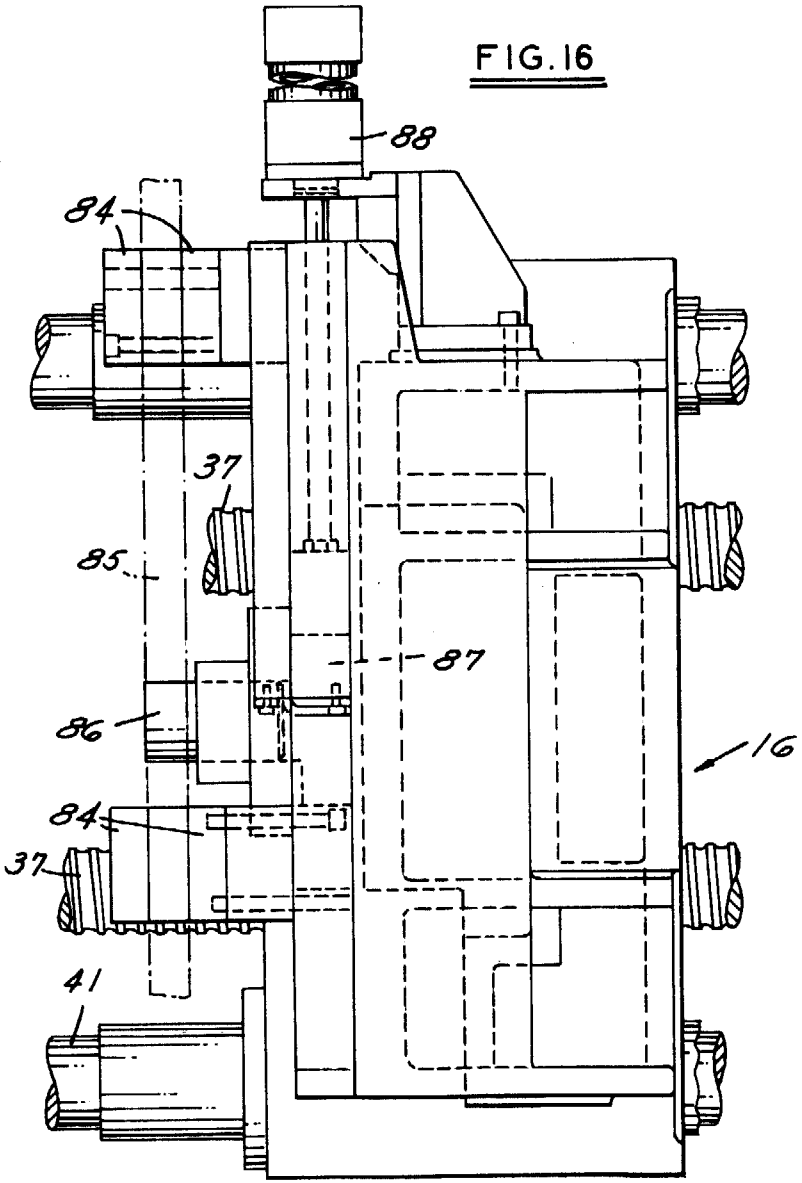
FIG. 16 is a plan view of the slide shown in FIG. 15.

With additional reference to FIGS. 15, 16 and 17 the main arm slide 16 includes a similar housing 46 with similar provisions for supported guide and positioning drive through the main arm drive assembly associated with housing extension 44m.

Referring again to FIGS. 8, 9 and 10 the pin arm slide assembly housing 39 contains a bearing 47 for coupling 48 extending between a driving head 49 and drive shaft 50 which is driven at synchronized speed with the crankshaft and disconnected from the crankshaft drive during indexing of a new crankshaft pin into aligned position for its finishing operation. At such time the drive head 49 is in the angular position shown in FIG. 9 with a pair of drive pins 51 extending into horizontal slot 52 in drive head coupling 53 for eccentric head 54 having a journal 55 rotatable in bearing 56 mounted in slide 57 which is retractable by power cylinder 58 from the operative position shown to a clearance position of the pin arm shoes for rotating or reloading the crankshaft. In such retracted position one of the drive pins 51 will remain in engagement with the slot 52 maintaining orientation of eccentric head 54.

Figures 11, 12:
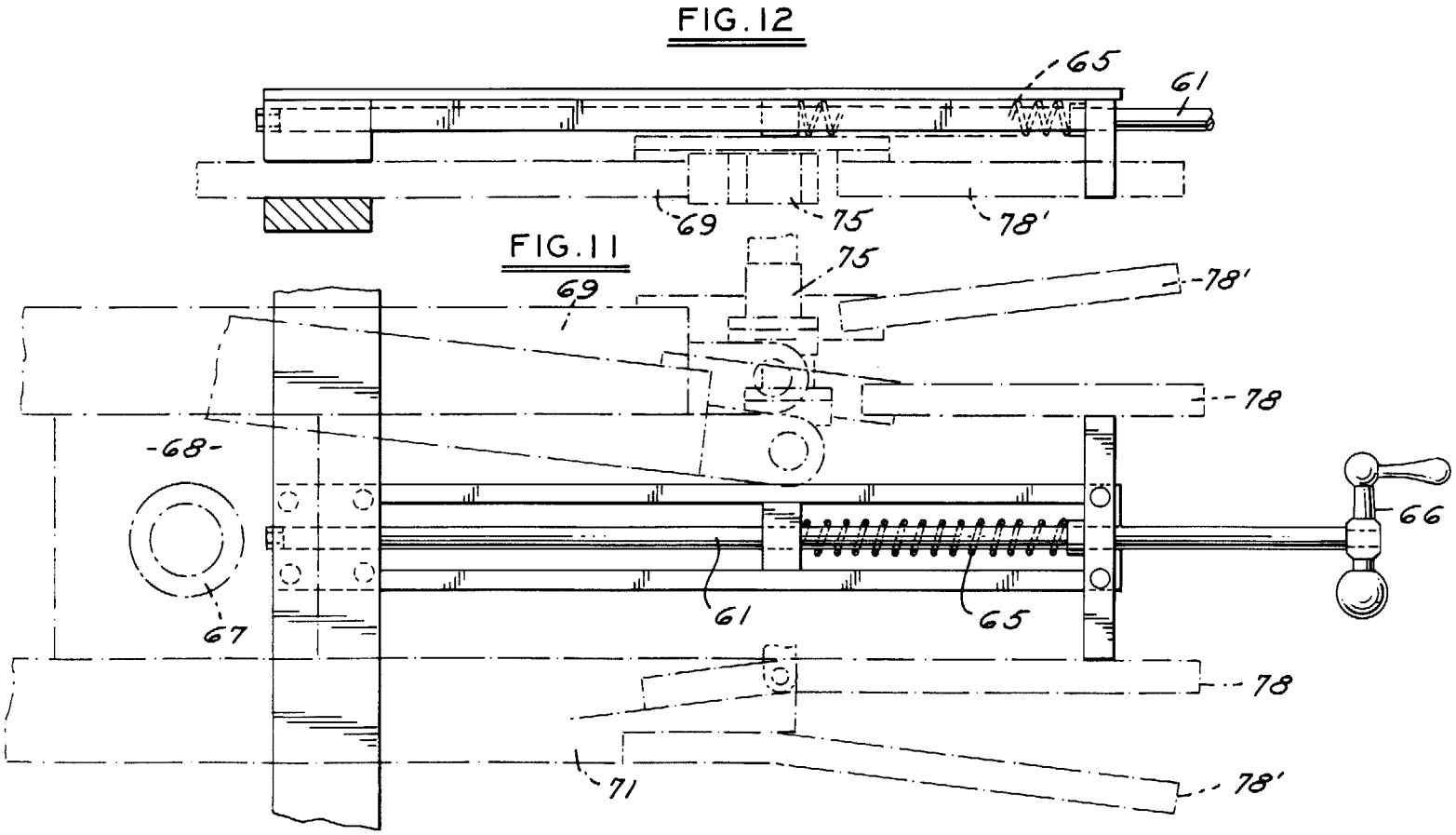
FIG. 11 is a fragmentary elevation taken along the line 11—11 of FIG. 9 showing adjustment screw for changing the eccentric radius of the pin arm.
FIG. 12 is a plan view of the adjustment screw shown in FIG. 11.

The head 54 carries a drive roll 59 mounted on a slide 60 which may be adjusted for varying the eccentric throw for different crankshafts through an extensible and retractable shaft 61 having an allen head 62 engageable with socket 63 in adjustment screw 64 adapted to actuate slide 60. With reference to FIGS. 11 and 12 when adjustment of eccentric drive roll 59 is required shaft 61 is extended to an actuating position compressing return spring 65, hand crank 66 being provided for remote manual adjustment.

Figure 14:
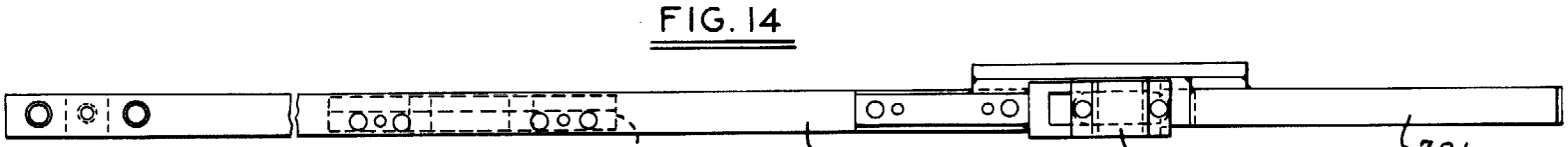
FIG. 14 is a plan view of the pin arm assembly shown in FIG. 13.
Figure 13:
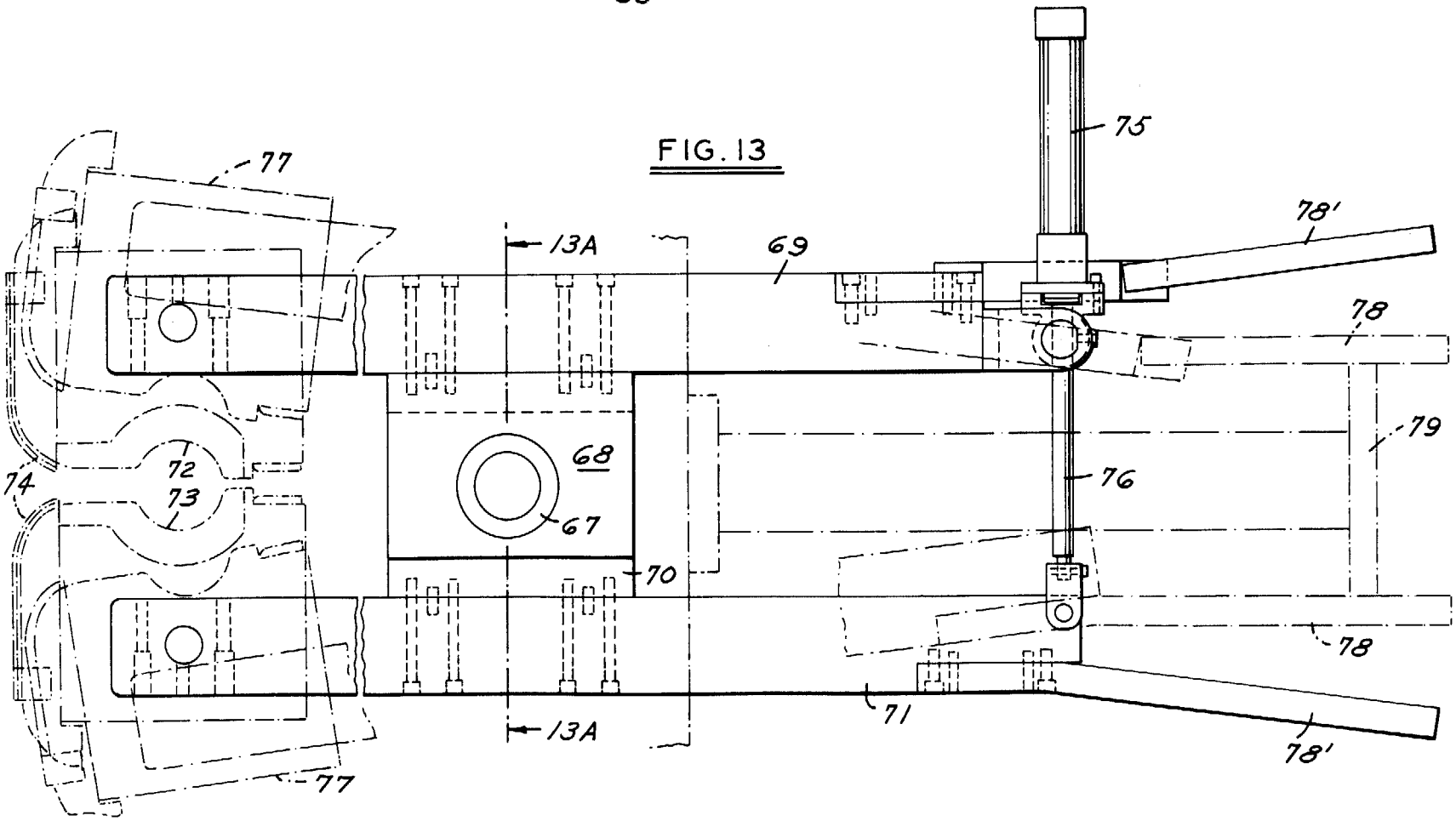
FIG. 13 is an enlarged end elevation of the pin arm assembly per se taken along the same line 8—8 of the pin arm slide assembly shown in FIG. 1 and FIG. 8.

With reference to FIGS. 13 and 14 the pin arm assembly is provided with bushing 67 internally engageable by drive roll 59 and externally coupling as a scissors pivot mounting extension 68 for upper pin arm 69 and similar extension 70 for lower pin arm 71. The operating ends of the upper and lower arms are respectively provided with upper shoe 72 and lower shoe 73 having guides 74 for leading a strip of polishing paper within shoes 72, 73 for engagement with the pin of the crankshaft.

A fluid pressure power cylinder 75 mounted on the upper pin arm has piston rod 76 connected to the lower pin arm for actuating the arm assembly to the phantom position shown at 77 at which arm extensions 78 engage fixed guide stop 79 for maintaining horizontal orientation of the arm assembly during advance and retraction of the assembly between operating and crankshaft indexing positions. Upon extension of piston rod 76 operating ends of the upper and lower arms are closed to a pin engaging position of shoes 72, 73 which, together with drive roll 59, maintain the arm assembly in horizontal attitude during simultaneous synchronized rotation of the crankshaft and eccentric head 54. During the operative position of the pin arm assembly as shown in full line, arm extensions 78 are in clearance positions 78' relative to guide stop 79, adjustment shaft 61 is in a retracted clearance position, and drive pins 51 of driving head 49 are in the position shown in FIG. 9 with journals 48 and 55 in axial alignment and establishing eccentric throw of drive roll 59 equal to and synchronized with the crankshaft pin engaged by shoes 72, 73.

Figure 10:
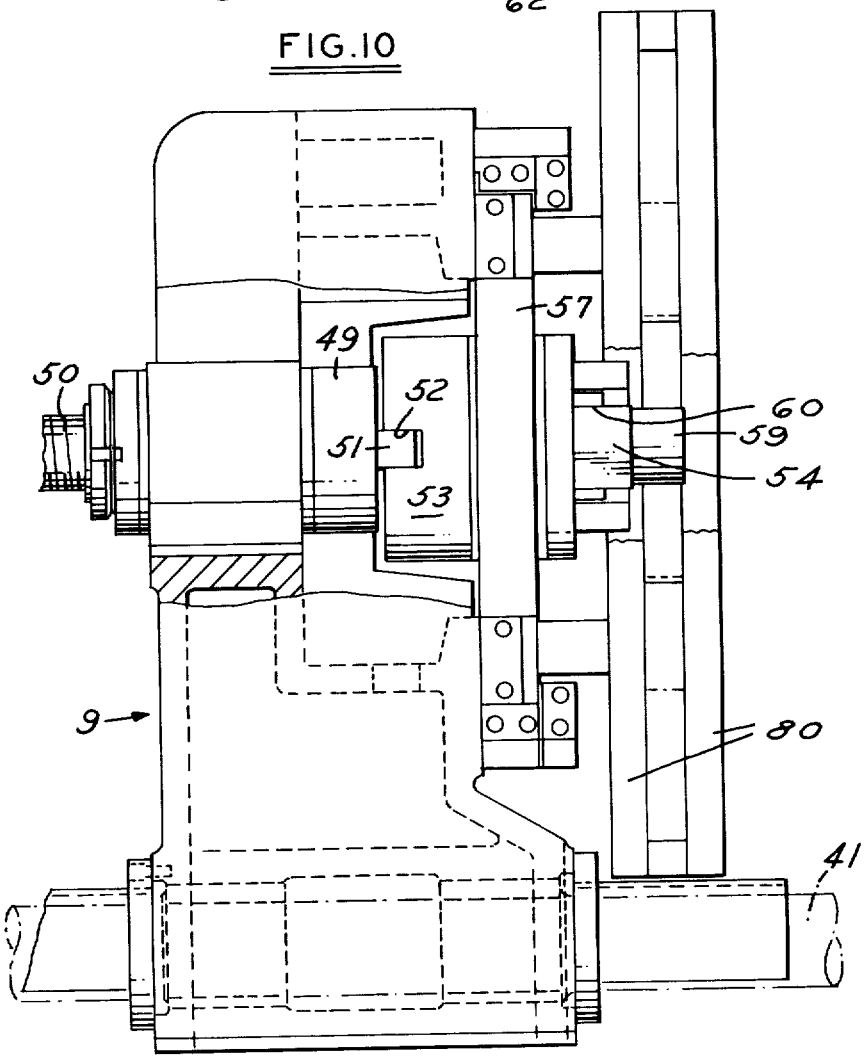
FIG. 10 is a partially sectioned side elevation taken along the line 10—10 of FIG. 9.

The arm assembly is substantially balanced with the center of gravity at the center of bushing 67 so as to minimize any inertia loading of shoes 72, 73 on the crank pin during the polishing operation and thereby achieve uniform polishing contact pressure throughout crankshaft rotation. As shown in FIGS. 8, 9 and 10 housing 39 for the pin arm assembly is provided with vertical spaced guides 80 for maintaining the pin arm assembly in proper alignment throughout positioning and polishing actuation.

As previously indicated, positioning of the housing 39 for initial alignment of the pin arm assembly with the center of the pin to be polished as well as reciprocating oscillation of housing 39 through actuation of pin arm drive 6 under the controller program positionally monitored by encoder 38 will cause the polishing paper within shoes 72, 73 to polish the extremities of the pin as required. Shoes 72, 73 will normally be fabricated to a maximum width appropriate for the minimum width of pin bearing to be polished so as to minimize reciprocation of the pin arm assembly with the controller program adapted to accommodate increased reciprocation for any wider pins which may be processed by the machine. Rolls of polishing paper stored in reels 74a are fed over the guides 74 as required between pin polishing operations under suitable feed controls not shown.

Figure 18:
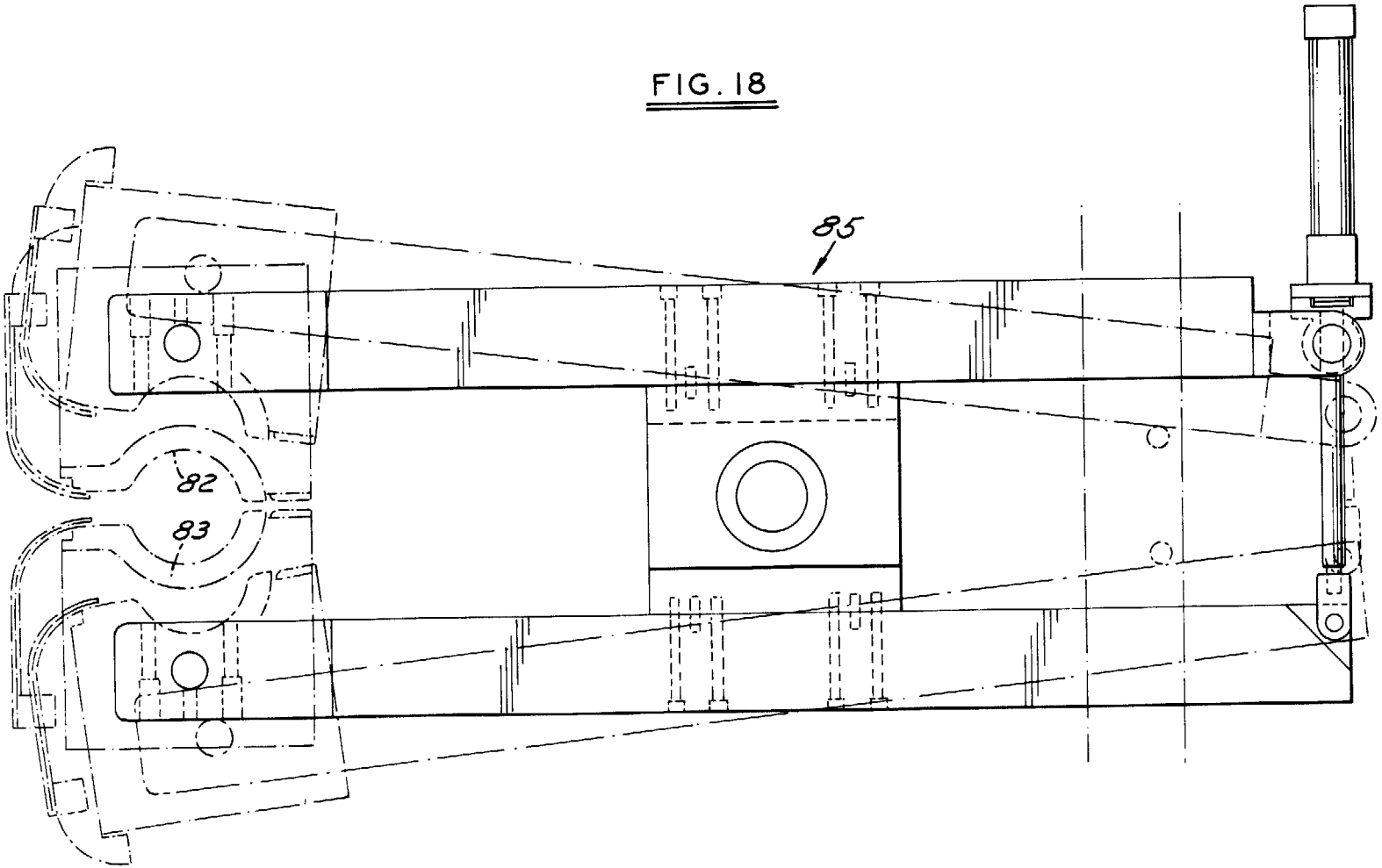
FIG. 18 is an enlarged elevation of the main arm assembly per se taken along the same line 15—15 as the main arm slide shown in FIG. 1 and FIG. 15.

With reference to FIGS. 15, 16 and 17 housing 81 of main arm slide 16 is positioned by main arm drive screw 82, in a manner similar to that shown in FIG. 8A for the pin arm drive, through the programmed controller, encoder 38 and hydraulic motor 34 independently of the pin arm slide. The main arm assembly shown in FIG. 18 is also similar in construction and actuation, for opening and closing shoes 82 and 83, to the pin arm assembly shown in FIG. 13. In this case since no eccentricity is involved vertical guides 84 serve only to accommodate reciprocal horizontal movement of main arm assembly 85 through engagement of drive roll 86 projecting from horizontal slide 87 positioned by hydraulic cylinder 88.

With reference to FIGS. 3, 3A, 4 and 5 the crankshaft drive is effected through hydraulic motor 89 coupled at 90 to shaft 32 which in turn drives sprocket 91, timing link belt 92, sprocket 93, sleeve 94, jaw 95, jaw clutch 96, sleeve 97, longitudinal bearing outer ball race 98, and inner ball race shaft 99 formed as an integral part of drive shaft 50 for the pin arm slide. Jaw clutch 96 is splined to sleeve 97 and has angular jaw positions 100 corresponding to and matching various indexable pin angles of the crankshafts to be processed on the machine. Cylinder 101 retracts jaw clutch 96 during change of crankshaft pin position while shaft 50 remains stationary and is actuated to reengage the jaw clutch for each new pin position of the crankshaft automatically determined by proximity switches 33. Idler sprocket 102 on adjustable lever 103 maintains the link belt tension to assure accurate synchronization of drive between crankshaft and pin arm.

Figure 5:
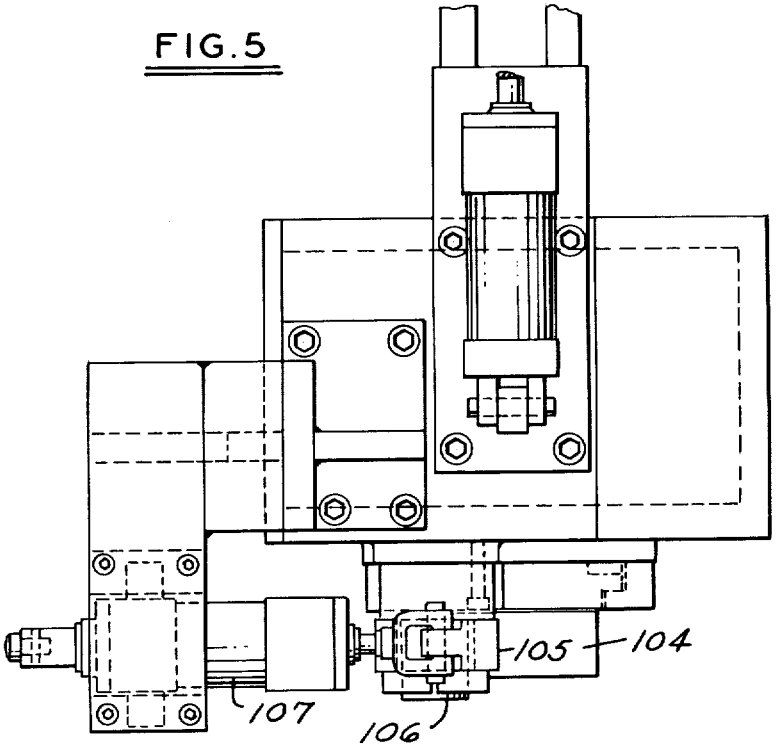
FIG. 5 is a side elevation taken along the line 5—5 of FIG. 4.
Figure 3:
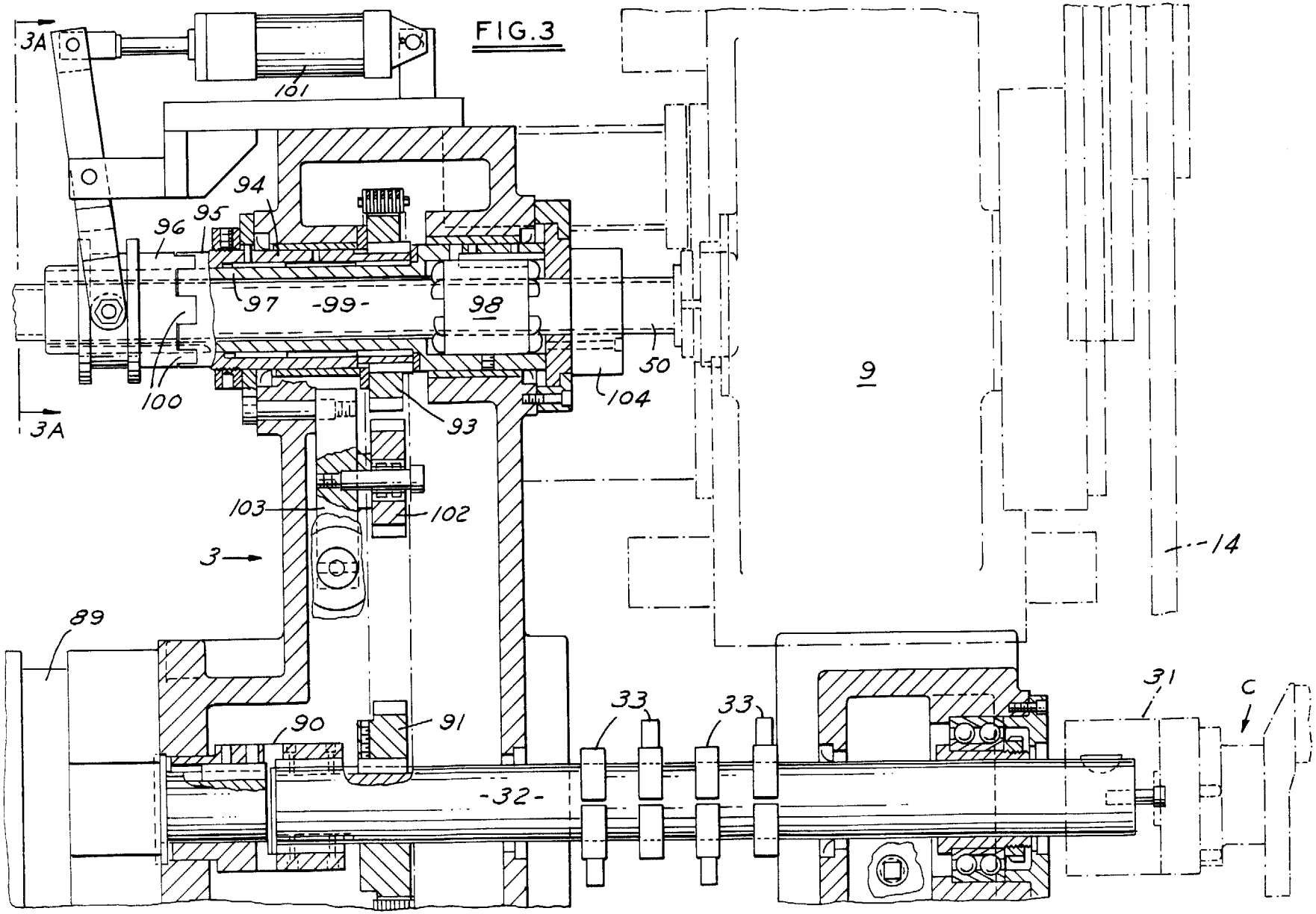
FIG. 3 is an enlarged partially sectioned plan view of the head stock shown in FIG. 1.
Figure 3A:
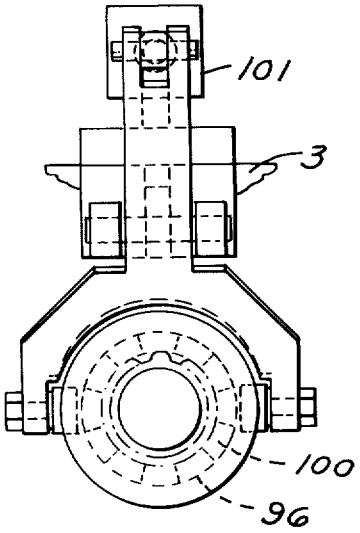
FIG. 3A is an end elevation taken along the line 3A—3A of FIG. 3.
Figure 4:
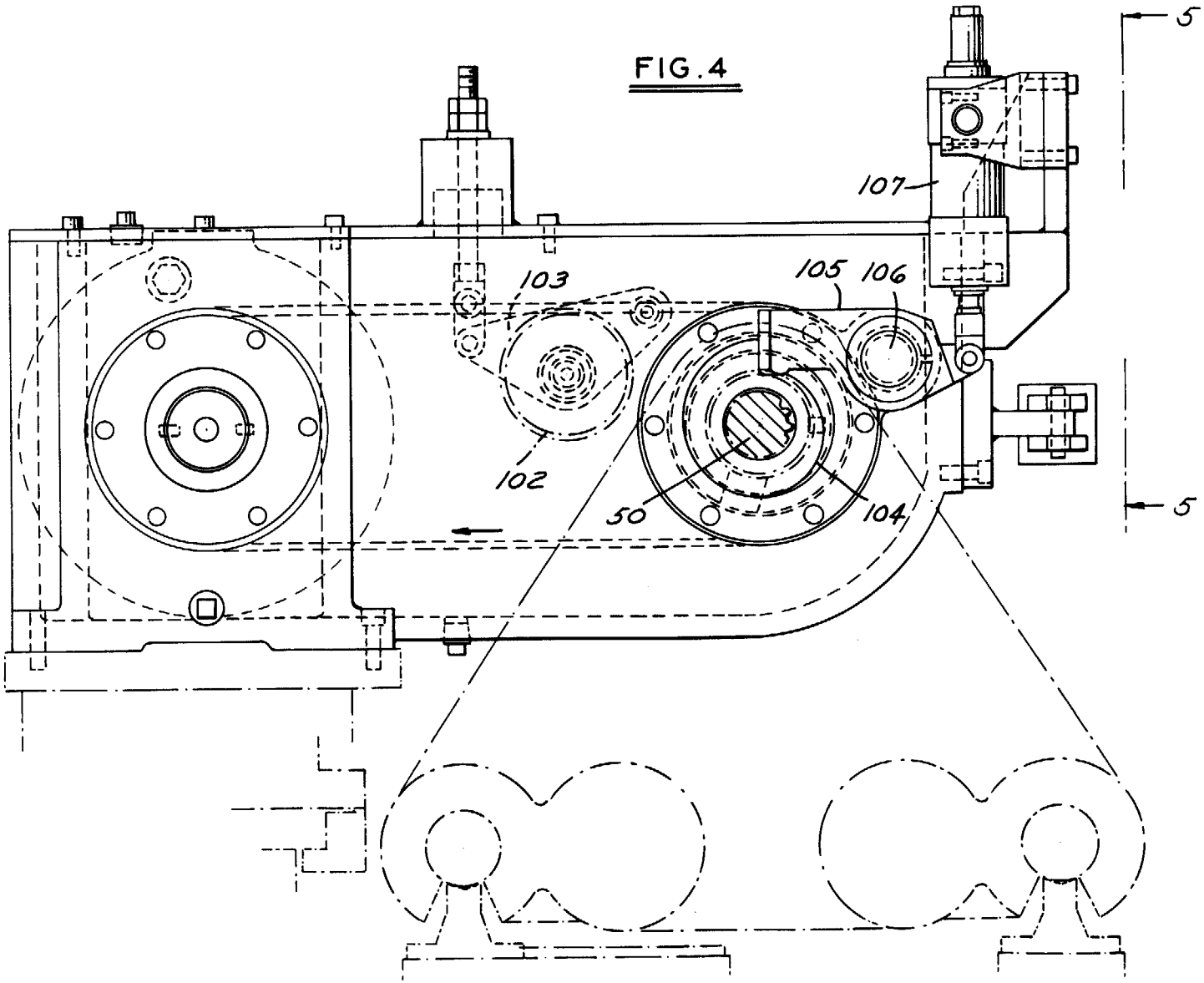
FIG. 4 is an end elevation of the head stock shown in FIG. 3.

As shown in FIGS. 3, 4 and 5 cam 104 secured to shaft 50 is engaged by the end of lever 105 pivoted at 106 actuated by cylinder 107 during the last revolution of the crankshaft, the end of the cam serving as a positive stop to prevent any drift in the drive of the crankshaft at the end of a polishing cycle and under progressive valve closing responsive to cam control to gradually stop the crankshaft at an accurate position where the pin being polished is in engagement and disengagement alignment with the pin arm at which time jaw clutch 96 is retracted and the crankshaft indexed to a new pin position controlled by a proximity switch 33 whereupon jaw clutch 96 is reengaged.

When the pin arm is opened and retracted and the pin arm slide is moved under programmed controller and encoder control to a new position with the pin arm aligned with the next pin to be polished, the main arm is likewise opened, retracted and moved to a new position in alignment with the next main crankshaft journal to be polished. Extension of the respective arms to crankshaft engaging position, closing the arms and crankshaft drive is then resumed with programmed reciprocating oscillation of the slides to again effect required polishing over the full pin and main bearing widths. Progressive similar polishing of pins and crankshaft bearings continues until all required are polished, it being understood that if polishing ends at the drive end of the crankshaft the pin arm will be idle in retracted position during polishing of the last main bearing. Upon completion of all polishing operations on a given crankshaft the last steps of the program extend loading support 25 and actuate cylinder 29 to retract the center 30 freeing the crankshaft for manual removal and manual loading of the next crankshaft with the first pin to be polished again in alignment facing the pin arm. Pushing a cycle button on the control box 28 will start a new cycle with cylinder 29 engaging the center 3 and drive coupling of the new crankshaft followed by full automatic completion of polishing operations.

Figure 20:
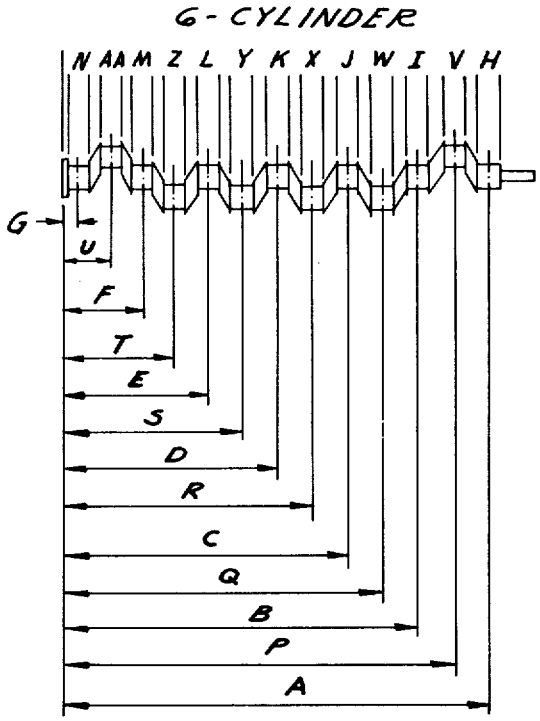
FIG. 20 is a chart and diagram for programming the automatic controller used in operating the machine.
Figure 20:
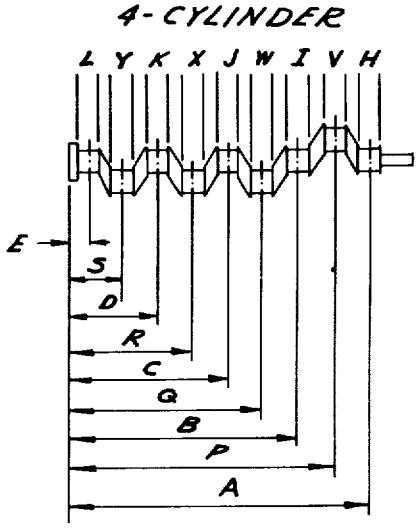

A series of like crankshafts can thus be processed automatically with manual operations limited to loading and unloading each crankshaft. A separate program may be entered in the programmable controller for each different crankshaft to be processed; for example, with reference to FIG. 20 dimensions for a given six cylinder crankshaft main bearing center lines may be entered as dimensions A, B, C, D, E, F and G, dimensions to the center line of the respective pin bearings entered as dimensions P, Q, R, S, T, and U, widths of the respective main bearings entered as H, I, J, K, L, M, and N and widths of the pin bearings as V, W, X, Y, Z, AA. With the encoder for the respective pin and main arm slides set at zero relative to the drive end of the crankshaft, automatic positioning of the respective slides to the respective center lines will take place as well as automatic oscillation of the slides to accommodate the respective entered widths of the crankshaft bearings to be polished.

In placing dimensions in proper registers using the chart on the four cylinder cranks zeros would be placed in dimension locations, F, G, M, N, T, U, Z, AA. If all main bearings or all pin bearings are not polishing adequately on both sides, the corresponding entered shoe width can be decreased thereby increasing the oscillation of all bearings. Individual bearings with this problem can be corrected by increasing the "bearing width" dimension for selective increase in oscillation. If an individual bearing is not polishing adequately on one side only the bearing location value can be altered to recenter the oscillation on the bearing.

Figure 19:
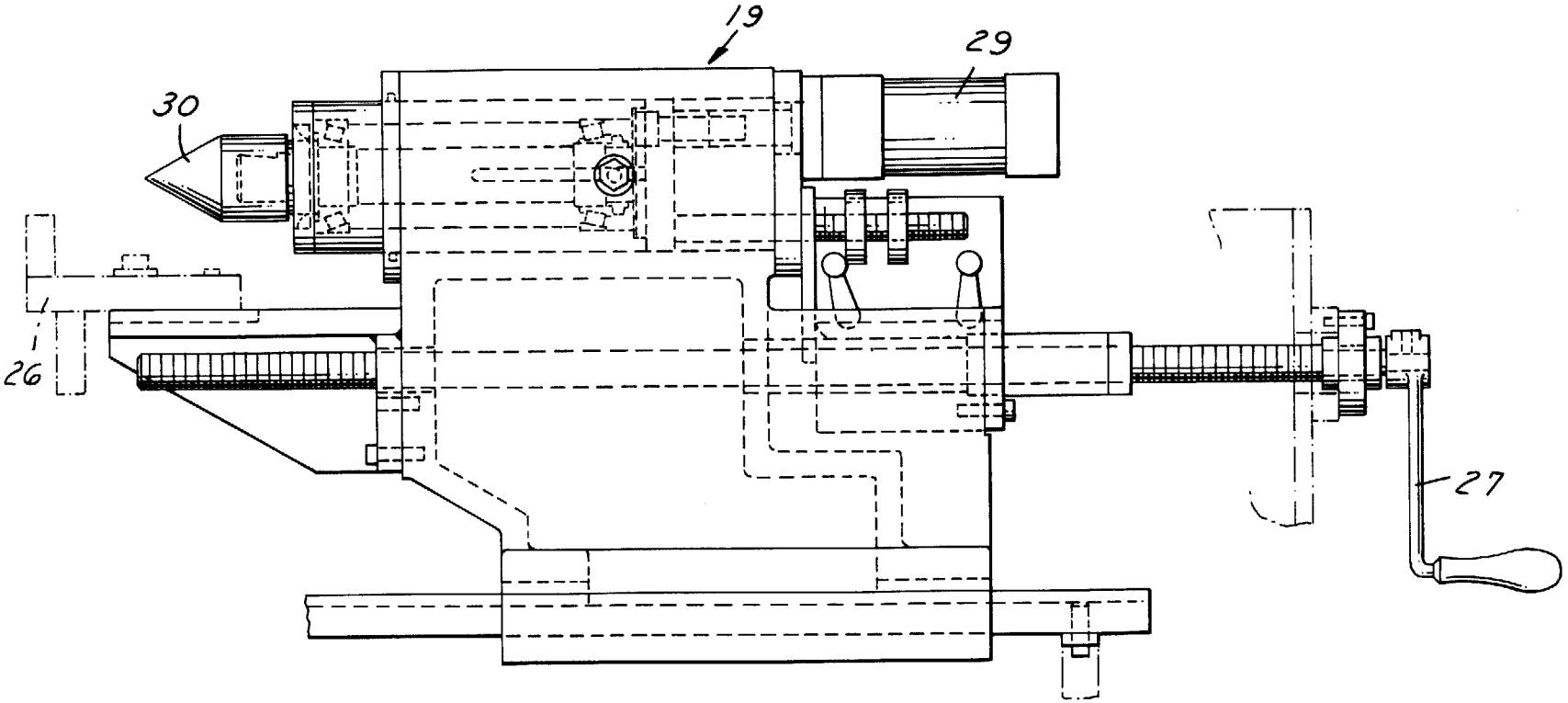
FIG. 19 is an enlarged side elevation of the tailstock shown in plan view in FIG. 1.

Manual adjustment for different length of crankshafts is made through adjustment of the tailstock by hand crank 27 as shown in FIG. 19 while manual adjustment of the eccentric throw can be made by shaft 61 and crank 66 as shown in FIGS. 9 and 11.

The control system is adapted for both manual and automatic modes of operation. In conjunction conventional solenoids, limit switches and controller relays typical Sequence of Operations for each mode may be set up as follows:

Manual

1. Extend tailstock
2. Lower loader
3. Position arms
4. Extend arms
5. Polish
6. Return arms
7. Orient part - repeat 1 through 7 until last bearing is polished
8. Return carriage
9. Raise loader
10. Return tailstock Automatic With loader extended - tailstock returned -

1. Depress cycle buttons
   Tailstock extends
2. With tailstock extended
   Loader lowers
3. With loader lowered
   Arms rough position - pin arm, main arm
4. With arms rough positioned
   Arms position - pin arm, main arm
5.
   (a) with arms positioned
   return pin index (paper feed)
   return main index
   (b) with main index returned-pin index returned
   extend main arm
   extend pin arm (unless last position)
6. With arms extended-pin, main
   (a) close polish shoes
   pin (unless last position)
   main
   (b) with shoes closed
   disengage cam positioner (unless last position)
   start coolant
   disengage orienter dog clutch (last position only)
   (c) with cam positioner disengaged (orientation dog clutch on last position) - rotate fast
   (d) with part rotating fast
   start pin oscillate
   start main oscillate
   count revolutions
   (e) count revolutions out
   (f) with revolution count out
   stop oscillation with arms centered
   (g) with arms centered
   rotate slow
   (h) while rotating slow
   check radial position
   (i) with proper radial position engage cam positioner (except last position)
   engage orientation latch (last position only)
   (j) with cam positioner engaged and orientation latch engaged open shoes and stop coolant
   (k) with index extended pin, main
7. With shoes open
   extend main index
   extend pin index
   return main arm
   return pin arm
8. With arms returned - pin
   orient part (if needed)
   disengage orientation dog clutch
   1. with orientation dog clutch disengaged
   rotate slow
   2. with part oriented
   engage orientation dog clutch
   3. with orientation dog clutch engaged -continued stop rotate
9. Repeat steps 4 to 8
   5 times for (4) cyl.
   7 times for (6) cyl.
10. With all bearings polished
   return carriage pin
11. With carriage returned
   extend loader
12. With loader extended
   retract tailstock
13. With tailstock returned
   CYCLE IS COMPLETE It will be understood that special programs may be set up for special cases such as in reprocessing crankshafts where only selective bearings need further polishing. It will also be understood that while a particular preferred embodiment has been disclosed in detail a number of optional modifications are possible within the scope of the present invention. For example, while hydraulic motor drives have been indicated for both crankshaft rotation and arm translation, DC motor drives may be substituted employing encoder and programmer for slow up; or commercially available two speed AC motor drives which include an integral brake adaptable to accurate stopping. While proximity switches have been disclosed for controlling the indexing of the pin bearings, an encoder such as employed in the pin and main arm drives may be substituted, particularly where the machine is adapted to process a large number of different cylinder crankshafts. Also, while the illustrated embodiment of the machine is for finish polishing of pin and main bearings, the same basic machine with only tooling modifications may be employed to effect final sizing, including use of appropriate close dimensioned shoes, thereby eliminating final grinding operations. Likewise burnishing rolls or filet polishing rolls may be substituted for the polishing paper and shoes.

As applied to polishing operations it has been found desirable to break up the relationship of axial oscillation to crankshaft rotation in order to effect optimum uniform polishing result. In practice an 18 second polishing time with two revolutions per second has been found satisfactory on typical crankshafts. For varying sizes of crankshaft 12 to 25 seconds of polishing time at 100 to 150 rpm is feasible with a 20 to 32 second total cycle time per bearing. In polishing operations a $\frac{1}{8}''$ float in the radial shoe position effected through pivoter slide connection has been found desirable to accommodate final self-centering of the shoe on the bearing during polishing operations.

It will be apparent from the foregoing disclosure that with the adaptability of the machine to different crankshaft configurations without change of tooling and with only one pin and one arm adapted to polish all bearings, automatic polishing of low and medium volume crankshaft production has been made feasible. The adjustable eccentric of the pin arm together with automatic translation gives the effect of a master crankshaft without the necessity of multiple arms. The single shoe with controlled oscillation accommodates any width of bearing. Other important features include the provision of pin arm drive retraction without losing orientation; disengagement of drive between crankshaft and eccentric without losing orientation; and minimization of weight and balancing of the pin arm to maximize possible speed of operation.

I claim:

1. A crankshaft bearing finishing machine comprising crankshaft rotating means, finishing arm means engageable with individual eccentric crankshaft pin bearings during rotation, means for retracting and moving said finishing arm means to a plurality of successive longitudinally spaced bearing positions, means for effecting finishing engagement with respective bearings at said spaced bearing positions, and eccentric drive means for said arm means separate from and synchronized with said crankshaft.

2. A machine as set forth in claim 1 including means for oscillating said finishing means over a selectively variable width during rotation of said crankshaft to reach the extremities of bearings of different crankshafts which may be variably wider than the engagement width of said finishing means.

3. A machine as set forth in claim 1 including an actuating connection for said arm means located substantially at its center of gravity.

4. A machine as set forth in claim 3 wherein said arm means includes a pair of pivotally connected arm extensions with an apertured bushing serving as the pivot, and said connecting means includes a cylindrical roll extending within said bushing, said roll being mounted on an eccentric with means or driving said eccentric at synchronized speed with said crankshaft, and with the radius of eccentricity of said roll equal to that of said crankshaft pins.

5. A machine as set forth in claim 4 including means for opening said arm extensions during said extension and retraction movement and for closing said arm extensions for crankshaft bearing finishing.

6. A machine as set forth in claim 5 including arm extension and stationary guide means engaged during open movement of said arm means cooperating with said pivot to maintain arm orientation during extension and retraction, and wherein pin bearing engagement with said finishing means cooperates with said drive roll to maintain arm orientation during finishing rotation of said crankshaft.

7. A machine as set forth in claim 1 including slide means for carrying said arm means and effecting said movement to said spaced bearing positions, stationary longitudinal guide means for said slide means and rotatable screw means for effecting longitudinal movement of said slide means, an encoder driven by said screw means for monitoring exact longitudinal position of said slide means.

8. A machine as set forth in claim 7 including programmable controller means cooperating with said encoder to effect programmed longitudinal movement of said slide means to said plurality of longitudinally spaced bearing positions.

9. A machine as set forth in claim 7 including programmable controller means cooperating with said encoder to effect programmed longitudinal movement of said slide means to said plurality of longitudinally spaced bearing positions and to effect programmed oscillating movement of said slide means to accommodate finishing to the extremities of bearings which may be wider than the engagement width of said finishing means.

10. A machine as set forth in claim 9 including arm guides mounted on said slide means for controlling the positioning of said arm means longitudinally of said crankshaft throughout all movements thereof.

11. A machine as set forth in any of claims 1, 3, 4–7, 8 or 9 including separately automatically controllable finishing means for simultaneously finishing respectively main and pin bearings of said crankshaft.

12. A machine as set forth in claim 1 including means for disengaging the synchronized drive between said crankshaft and finishing means during indexing of said crankshaft to a new angular position and for reengaging the drive connection for synchronized drive relative to said new angular position.

13. A machine as set forth in claim 1 including proximity switch means for controlling the angular positioning of said crankshaft preparatory to finishing each of said pin bearings.

14. A machine as set forth in claim 1 including means for adjusting the eccentric throw of said drive means to match the throw of different crankshaft pins being finished.

15. A machine as set forth in claim 12 wherein said eccentric drive means is retracted for repositioning when said drive connection is at a specific angular position of said crankshaft and wherein a drive coupling means is provided between said eccentric and a driving element whose axis remains fixed during said retraction of said eccentric drive means.

16. A machine as set forth in claim 2 including polishing strip guide means at the extremities of said arm means for carrying a polishing strip into operative relationship with said bearings.

17. A machine as set forth in claim 11 including programmable means for effecting adjustment for different crankshafts with regard to a plurality of the following variables: number of pins, longitudinal location of pins, dimensional width of pins and like variables of concentric main crankshaft bearings.

*18. A machine for performing finishing operations such as polishing, burnishing or fillet rolling on individual rotatable workpiece shafts, each having a plurality of longitudinally spaced individual eccentric circumferential surfaces, comprising, shaft rotating means, means engageable with an individual eccentric circumferential surface during shaft rotation for finishing said surface, means mounting said finishing means for synchronized movement with said individual eccentric surfaces, electronically variable programmable means for precisely locating successive positions of a plurality of said surfaces, means for dimensionally preprogramming said programmable means to selectively identify a plurality of said surfaces to be finished on a given shaft, and accurately controllable power means responsive to said preprogrammed programmable means to withdraw said finishing means from said individual eccentric surface and to move said finishing means longitudinally successively to each of said selectively identified surfaces and thereupon to engage and finish said surface.*

*19. A machine as set forth in claim 18 including means longitudinally of said shaft for oscillating said finishing means during rotation of said shaft to reach the extremities of circumferential surfaces which may be wider than the engagement width of said finishing means.*

*20. A machine as set forth in claim 18 including means longitudinally of said shaft for oscillating said finishing means over a selectively variable width during rotation of said shaft to reach the extremities of circumferential surfaces which may be wider than the engagement width of said finishing means.*

*21. A machine as set forth in claim 18 including means longitudinally of said shaft for oscillating said finishing means over a selectively variable width during rotation of*

*said shaft to reach the extremities of different shafts which may be variably wider than the engagement width of said finishing means.*

*22. A machine as set forth in claim 18 wherein said means mounting said finishing means includes arm means having finishing tooling thereon, said means to withdraw including means for retracting said arm means for said movement to said spaced circumferential surfaces, and said means to engage including means for extending said arm means with finishing tooling into said finishing engagement.*

*23. A machine as set forth in claim 22 including slide means for carrying said arm means and effecting said movement to said spaced circumferential surfaces, stationary longitudinal guide means for said slide means, rotatable screw means for effecting longitudinal movement of said slide means, and an encoder driven by said screw means for monitoring exact longitudinal position of said slide means.*

*24. A machine as set forth in claim 23 including programmable controller means cooperating with said encoder to effect programmed longitudinal movement of said slide means to said plurality of longitudinally spaced circumferential surface positions.*

*25. A machine as set forth in claim 24 including means to effect programmed oscillating movement of said slide longitudinally of said shaft means to accommodate finishing to the extremities of circumferential surfaces which may be wider than the engagement of said finishing means.*

*26. A machine as set forth in any one of claims 18–25 for rotatable workpiece shafts having a plurality of longitudinally spaced individual concentric as well as eccentric circumferential surfaces including separately controllable finishing means responsive to said programmable means, said preprogrammable means and said power means for finishing respectively said concentric and said eccentric circumferential surfaces.*

*27. A machine as set forth in claim 26 including means for simultaneously finishing respectively concentric and said eccentric circumferential surfaces.*

* * * * *